United States Patent
Clayton et al.

(10) Patent No.: US 9,412,126 B2
(45) Date of Patent: Aug. 9, 2016

(54) SYSTEM AND METHOD FOR COMMERCIALIZING AVATARS

(75) Inventors: Darnell Clayton, Atlanta, GA (US); Horst Schroeter, New Providence, NJ (US); E-Lee Chang, Mableton, GA (US); Linda Roberts, Decatur, GA (US); Madhur Khandelwal, Atlanta, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1727 days.

(21) Appl. No.: 12/266,438

(22) Filed: Nov. 6, 2008

(65) Prior Publication Data

US 2010/0114737 A1    May 6, 2010

(51) Int. Cl.
*G06F 21/00* (2013.01)
*G06Q 30/06* (2012.01)

(52) U.S. Cl.
CPC ........ *G06Q 30/0603* (2013.01); *G06Q 30/0601* (2013.01)

(58) Field of Classification Search
CPC ................................................. G06Q 30/0603
USPC .......................................................... 705/51
See application file for complete search history.

(56) References Cited

U.S. PATENT DOCUMENTS

| | | | |
|---|---|---|---|
| 6,948,131 B1 * | 9/2005 | Neven et al. ................... 715/753 |
| 6,970,177 B2 * | 11/2005 | Yamada et al. ................ 345/629 |
| 7,085,259 B2 * | 8/2006 | Wang et al. .................... 370/352 |
| 7,184,047 B1 * | 2/2007 | Crampton ...................... 345/473 |
| 7,233,988 B2 * | 6/2007 | Minakuchi et al. ............ 709/224 |
| 7,249,139 B2 * | 7/2007 | Chuah et al. |
| 7,396,281 B2 * | 7/2008 | Mendelsohn et al. ........... 463/42 |
| 7,720,733 B2 * | 5/2010 | Jung et al. ........................ 705/35 |
| 7,796,190 B2 * | 9/2010 | Basso et al. .................... 348/445 |
| 7,941,349 B2 * | 5/2011 | Lee ............................... 705/26.5 |
| 8,146,005 B2 * | 3/2012 | Jones et al. .................... 715/760 |
| 2002/0052918 A1 * | 5/2002 | Rekimoto et al. ............. 709/204 |
| 2003/0008713 A1 * | 1/2003 | Ushiro et al. .................... 463/42 |
| 2003/0046689 A1 * | 3/2003 | Gaos ............................... 725/34 |
| 2003/0065797 A1 * | 4/2003 | Fujisawa .............. G06Q 10/107 709/229 |
| 2004/0095389 A1 * | 5/2004 | Sidner et al. .................. 345/764 |
| 2005/0101845 A1 * | 5/2005 | Nihtila .......................... 600/300 |

(Continued)

OTHER PUBLICATIONS

White, Ron, How Computers Work, 9th Ed., Que Corporation, Nov. 14, 2007.*

(Continued)

*Primary Examiner* — Alexis Casey
(74) *Attorney, Agent, or Firm* — Guntin & Gust, PLC; Joseph Hrutka

(57) ABSTRACT

A system that incorporates teachings of the present disclosure may include, for example, a system having a controller to offer for sale an avatar engine that generates a visual representation of an interactive avatar capable of engaging in a verbal communication exchange by way of an audio system of a computing device from which the avatar engine is adapted to operate, receive a purchase request from a communication device, transmit to the communication device a usage policy and a copy of the avatar engine responsive to determining that the purchase request involves a request for a reproduction of at least a portion of the avatar engine, and enable the communication device to access services of the avatar engine responsive to determining that the purchase request involves the request for services of the avatar engine. Other embodiments are disclosed.

8 Claims, 9 Drawing Sheets

(56) References Cited

U.S. PATENT DOCUMENTS

| | | | |
|---|---|---|---|
| 2005/0190188 A1* | 9/2005 | Anzawa et al. | 345/474 |
| 2005/0223328 A1* | 10/2005 | Ashtekar et al. | 715/706 |
| 2005/0248574 A1* | 11/2005 | Ashtekar et al. | 345/473 |
| 2006/0015580 A1* | 1/2006 | Gabriel et al. | 709/219 |
| 2006/0046699 A1* | 3/2006 | Guyot et al. | 455/414.1 |
| 2006/0092037 A1* | 5/2006 | Neogi et al. | 340/825.22 |
| 2006/0294465 A1* | 12/2006 | Ronen et al. | 715/706 |
| 2007/0050716 A1* | 3/2007 | Leahy et al. | 715/706 |
| 2007/0060368 A1* | 3/2007 | Cheng | 463/42 |
| 2007/0074114 A1* | 3/2007 | Adjali et al. | 715/706 |
| 2007/0260984 A1* | 11/2007 | Marks et al. | 715/706 |
| 2008/0052242 A1* | 2/2008 | Merritt et al. | 705/59 |
| 2008/0146334 A1* | 6/2008 | Kil | 463/36 |
| 2008/0195699 A1* | 8/2008 | Min et al. | 709/203 |
| 2008/0263458 A1* | 10/2008 | Altberg et al. | 715/757 |
| 2008/0268956 A1* | 10/2008 | Suzuki | 463/37 |
| 2008/0303811 A1* | 12/2008 | Van Luchene | 345/419 |
| 2009/0044113 A1* | 2/2009 | Jones et al. | 715/707 |
| 2009/0315893 A1* | 12/2009 | Smith et al. | 345/473 |
| 2009/0328087 A1* | 12/2009 | Higgins et al. | 725/10 |
| 2010/0082567 A1* | 4/2010 | Rosenblatt et al. | 707/705 |
| 2011/0115798 A1* | 5/2011 | Nayar et al. | 345/473 |

OTHER PUBLICATIONS

Derfler, Frank J. et. al., How Networks Work, 7th Ed., Que Corporation, Oct. 18, 2004.*

Cosatto et al., "Lifelike Talking Faces for Interactive Service" pp. 1406-1429, Proceedings of IEEE, vol. 91, No. 9, Sep. 2003.*

Youtube, "Apple Futureshock, Knowledge Navigator", 2 pages, http://www.youtube.com/watch?v=3WdS4Tscwh8, web site last visited Sep. 18, 2008.

Cosatto et al., "Lifelike Talking Faces for Interactive Service", pp. 1406-1429, Proceedings of the IEEE, vol. 91, No. 9, Sep. 2003.

Cosatto et al., "From Audio-Only to Audio and Video Text-to-Speech", pp. 1084-1095, Acta Acustica United with Acustica, vol. 90, Accepted Apr. 14, 2004.

Secondlife, "Virtual Worlds, Avatars, 3D Chat, Online meetings", 1 page, http:/secondlife.com/ Web site last visited Oct. 20, 2008.

Lively, "Create an Avatar and Chat with your Friends in Rooms you Design", 1 page, http://www.lively.com/html/landing.html, Web site last visited Oct. 20, 2008.

USATODAY.com, "Sony, Microsoft Virtual Communities to Start", 3 pages, http://www.usatoday.com/tech/gaming/2008-10-09-sony-microsoft_N.htm, Web site last visited Oct. 20, 2008.

Xbox.com, "Welcome to the New Xbox Experience", 1 page, http://www.xbox.com/en-us/live/nxe/, Web site last visited Oct. 20, 2008.

* cited by examiner

200

600

SYSTEM AND METHOD FOR COMMERCIALIZING AVATARS

FIELD OF THE DISCLOSURE

The present disclosure relates generally to avatar presentation techniques and more specifically to a system and method for sharing avatars.

BACKGROUND

Developments in speech synthesis and computer animation enable the real-time synthesis of faces that look and sound like actual people. With recent advances in speech recognition, natural language interpretation and speech synthesis, conversational interfaces are finding wider acceptance. Collectively, these technologies can be used to produce human-like or animated interactive avatars.

DETAILED DESCRIPTION

One embodiment of the present disclosure can entail a system having a controller to offer for sale an avatar engine that generates a visual representation of an interactive avatar capable of engaging in a verbal communication exchange by way of an audio system of a computing device from which the avatar engine is adapted to operate, receive a purchase request from a communication device, transmit to the communication device a usage policy and a copy of the avatar engine responsive to determining that the purchase request involves a request for a reproduction of at least a portion of the avatar engine, and enable the communication device to access services of the avatar engine responsive to determining that the purchase request involves the request for services of the avatar engine.

Another embodiment of the present disclosure can entail a computer-readable storage medium operating having computer instructions for receiving from a communication device a purchase request for an avatar engine that generates an interactive avatar capable of engaging in a verbal communication exchange by way of an audio system of the communication device, transmitting to the communication device a usage policy and a copy of the avatar engine responsive to determining that the purchase request involves a request for a reproduction of at least a portion the avatar engine, and enabling the communication device to access services of the avatar engine responsive to determining that the purchase request involves the request for services of the avatar engine.

Yet another embodiment of the present disclosure can entail a communication device having a controller to transmit to a system a purchase request for an avatar engine that generates an interactive avatar capable of engaging in a verbal communication exchange by way of an audio system of the communication device, receive from the system a usage policy and a copy of the avatar engine responsive to the purchase request involving a request for a reproduction of at least a portion of the avatar engine, and receive a signal from the system indicating that services of the avatar engine are accessible to the communication device responsive to the purchase request involving a request for services of the avatar engine.

Figure 1:
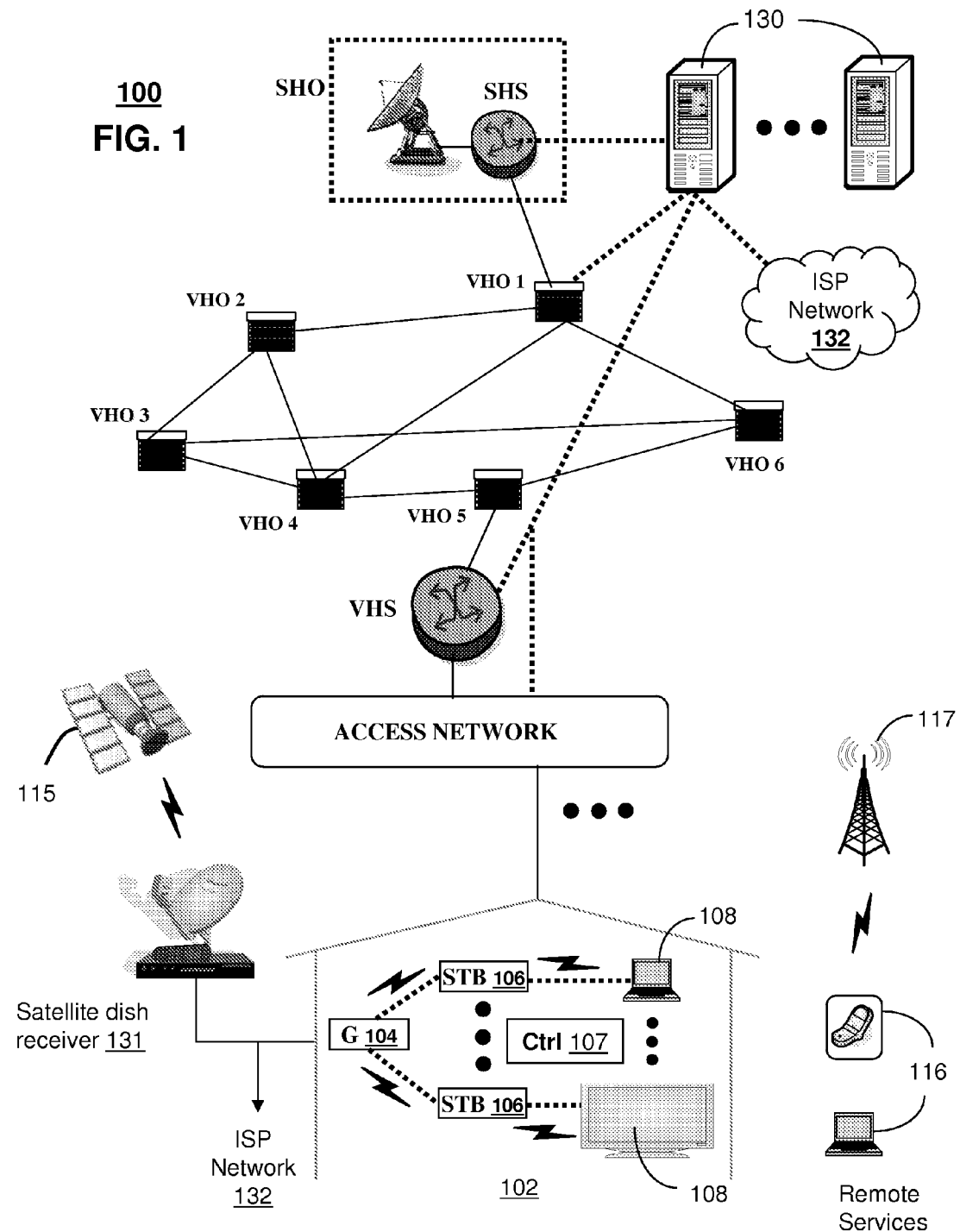
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

Another distinct portion of the one or more computing devices 130 can be used as an avatar engine (herein referred to as an avatar engine 130) for generating and managing interactive avatars which users of the first communication system 100 can be presented. Existing technology in speech synthesis and computer animation can enable the real-time synthesis of faces that look like actual people. With recent advances in speech recognition, natural language interpretation and speech synthesis, conversational interfaces are finding wider acceptance. Collectively, these technologies can be used by the avatar engine 130 to produce human-like or animated interactive avatars.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
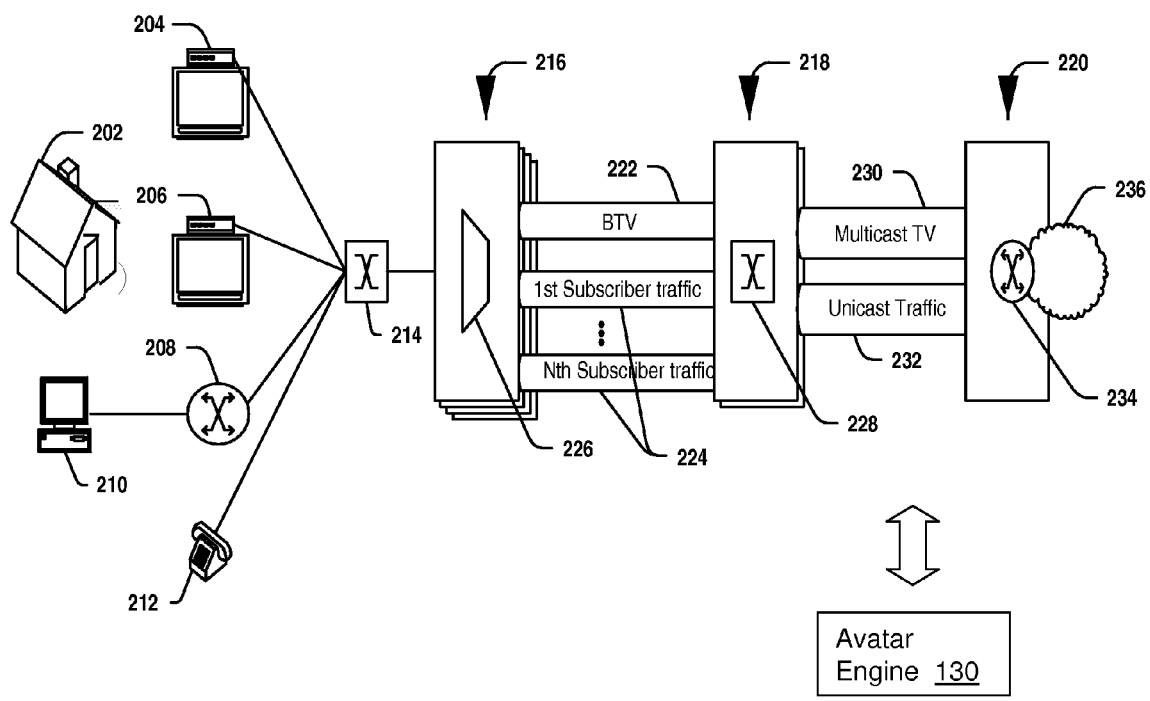

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The avatar engine 130 of FIG. 1 can be operably coupled to the second communication system 200 for purposes similar to those described above.

Figure 3:
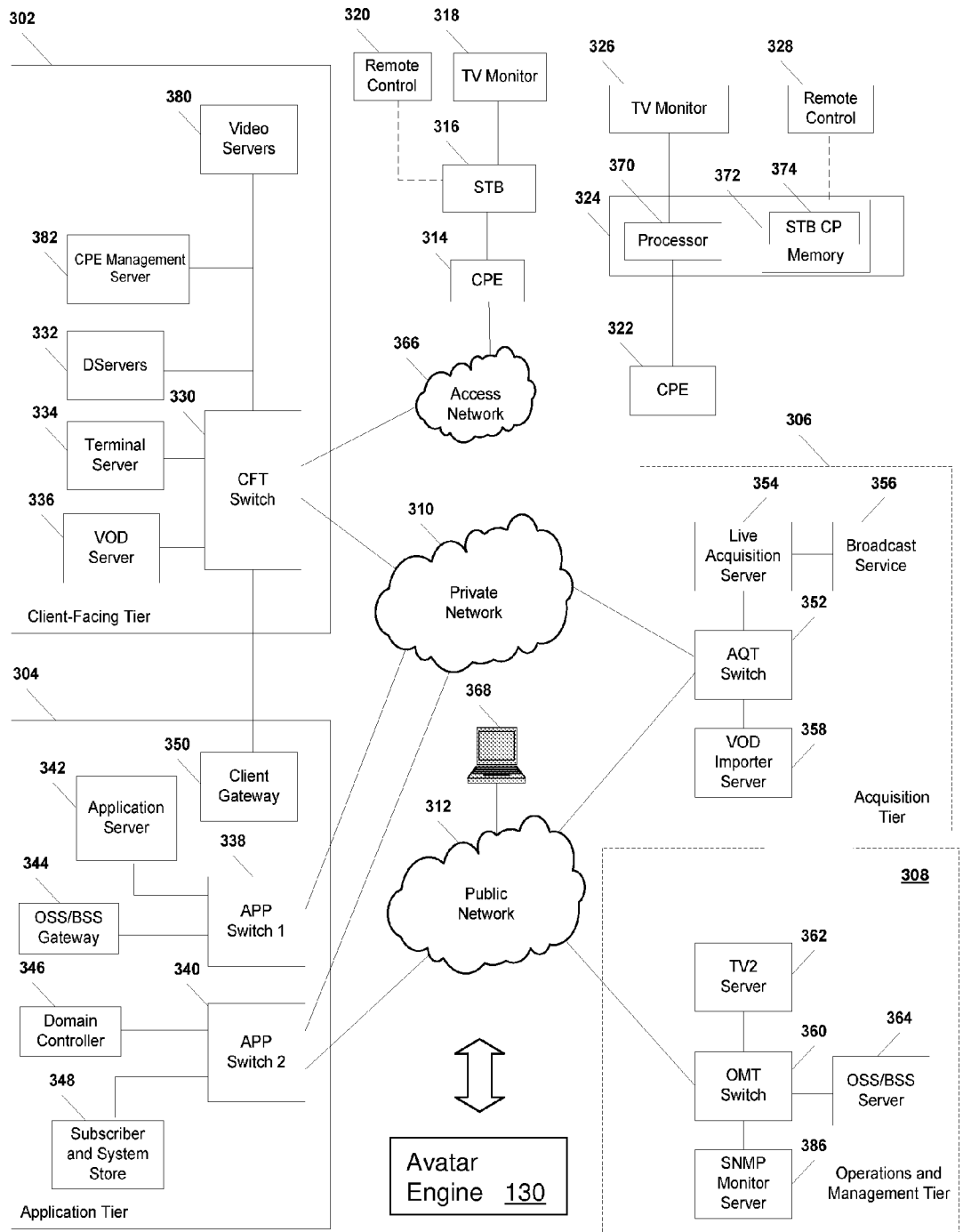

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The avatar engine 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
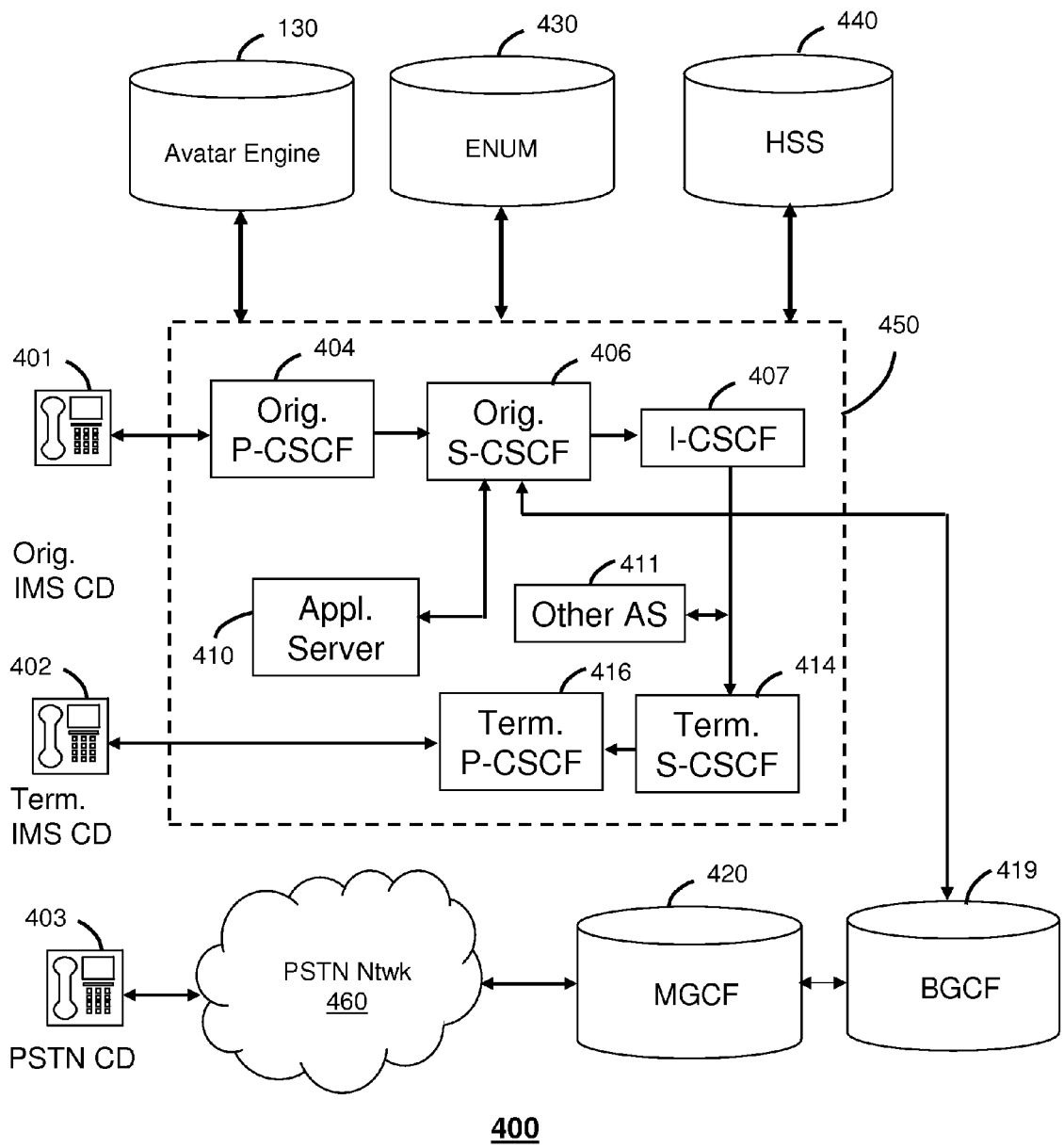

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E. 164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the avatar engine 130 previously discussed for FIG. 1. In this representative embodiment, the avatar engine 130 can be accessed over a PSTN or VoIP channel of communication system 400 by common techniques such as described above.

Figure 5:
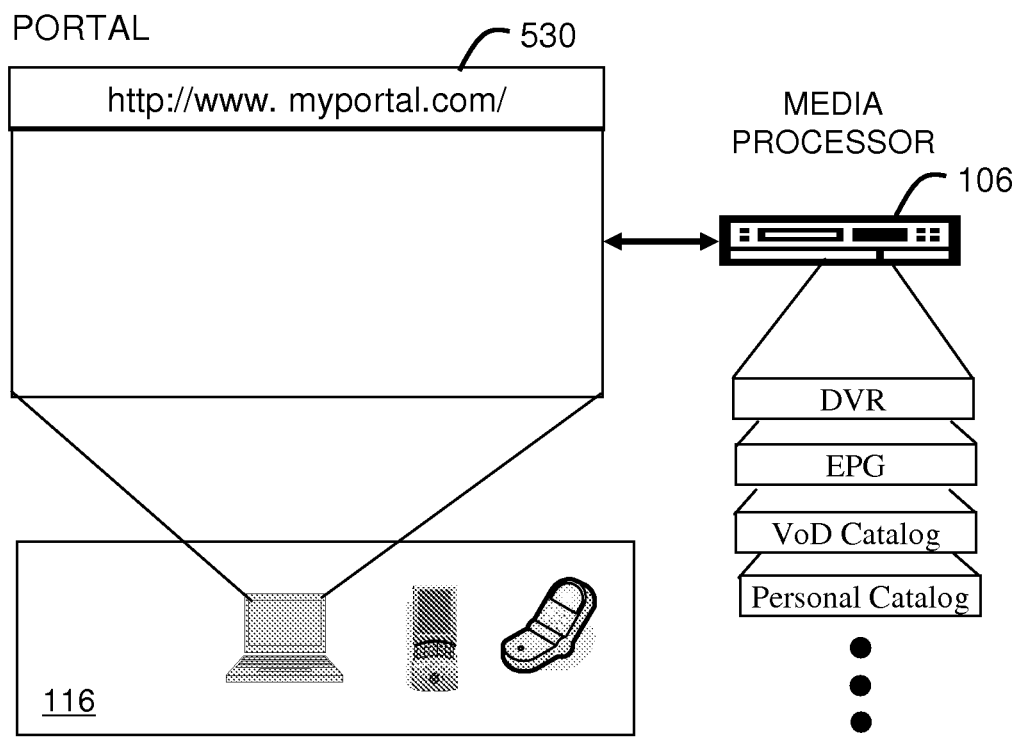
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
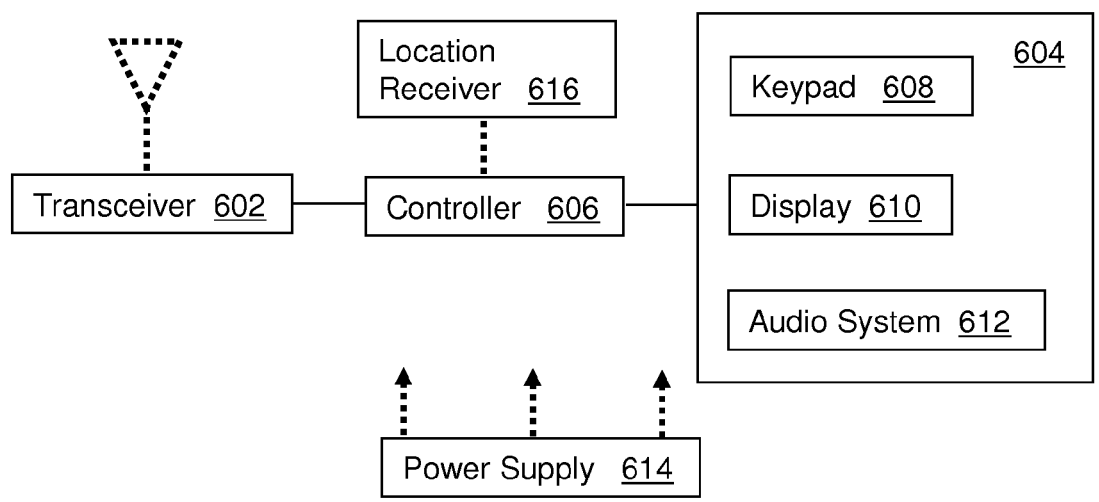
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
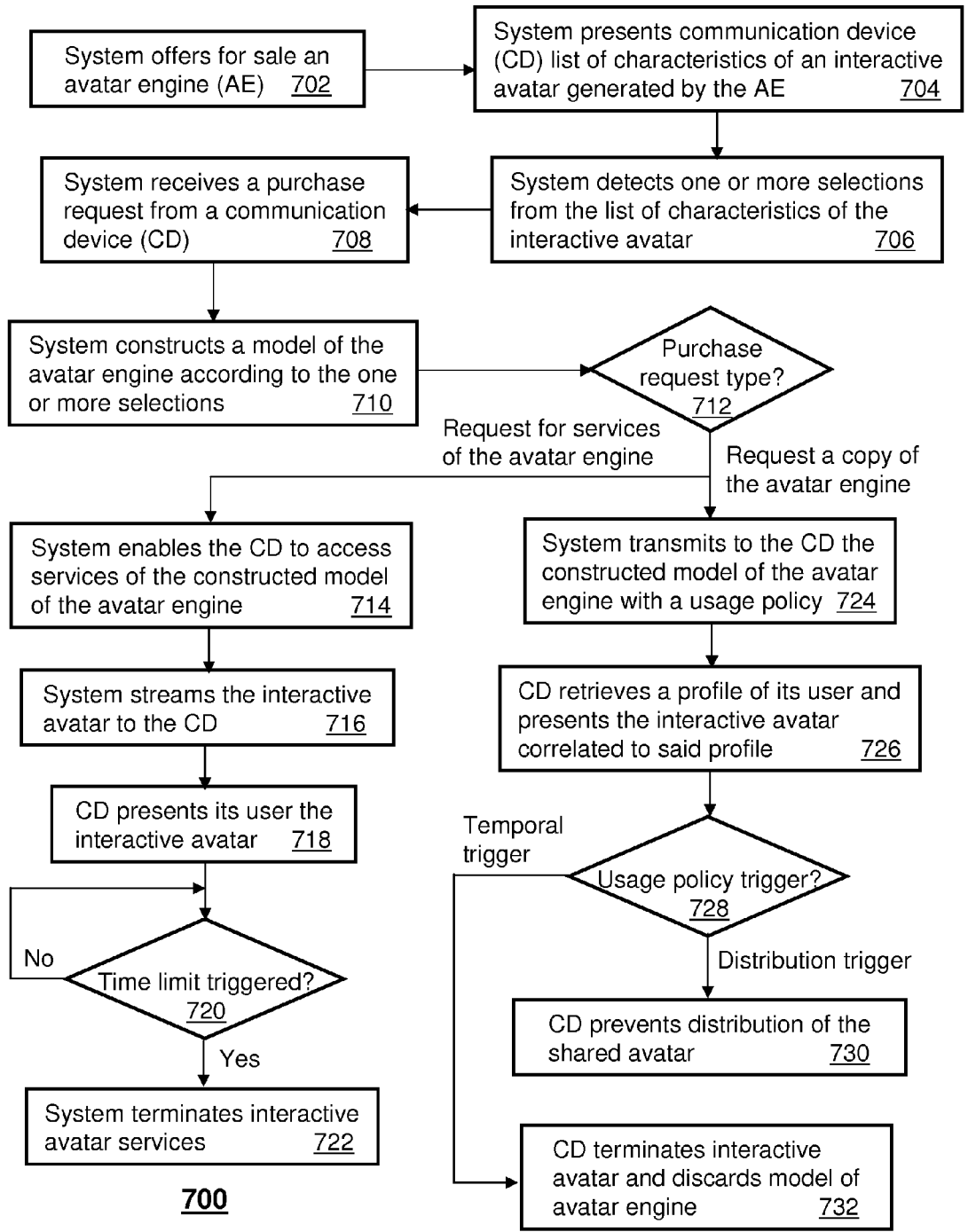
FIG. 7 depicts an illustrative embodiment of a method operating in portions of the communication systems of FIGS. 1-4.
Figure 8:
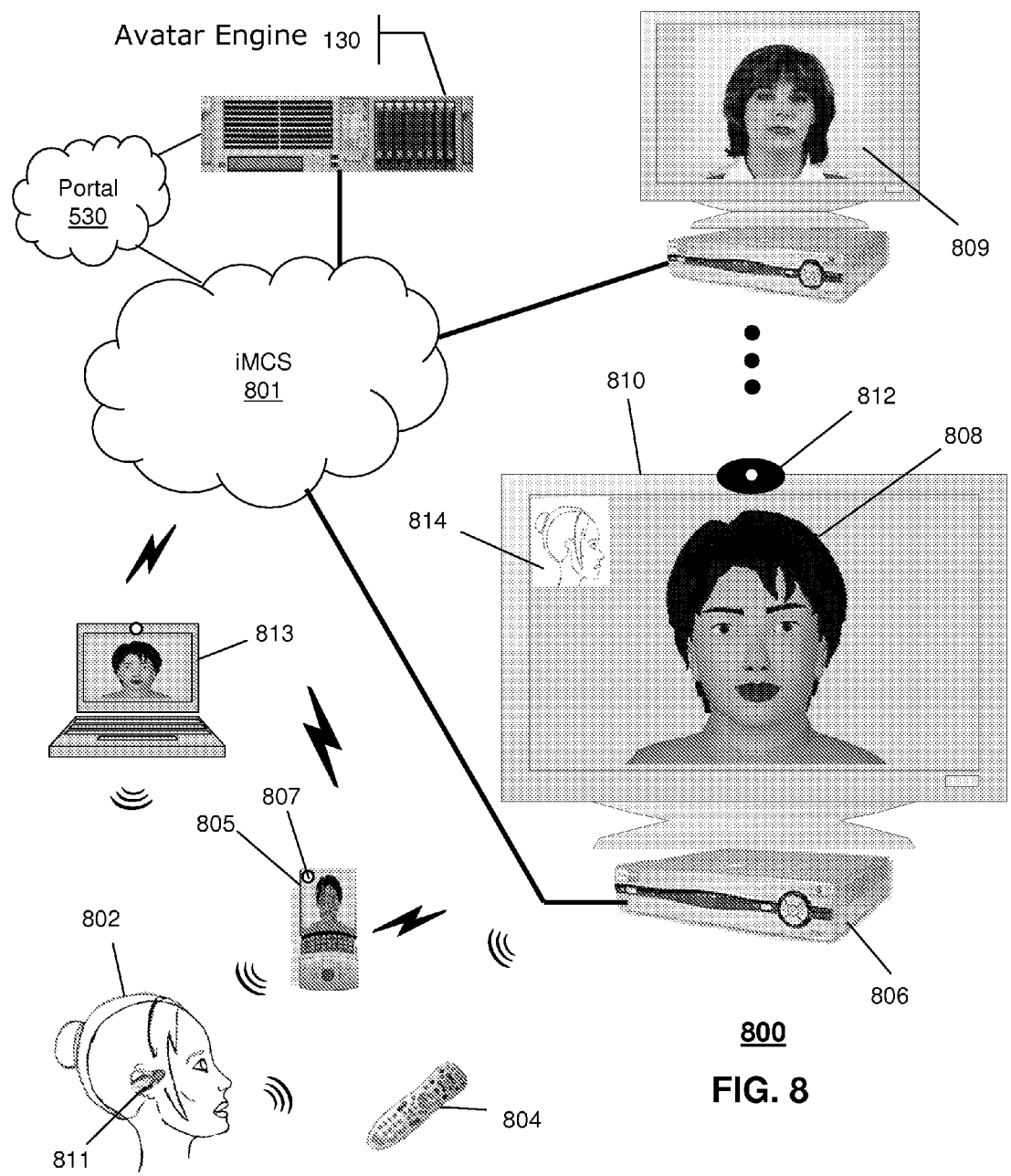
FIG. 8 depicts an illustrative embodiment of a system operating according to the method of FIG. 7.

FIG. 7 depicts an illustrative method 700 operating in portions of communication systems 100-400. FIG. 8 depicts an illustrative embodiment of a communication system 800 operating according to the method of FIG. 7. FIG. 8 depicts an interactive media communication system (iMCS) 801 such as the systems shown in FIGS. 1-4 (singly or collectively). The iMCS can be coupled to the portal 530 (previously described), the avatar engine 130, and one or more STBs 806. The portal 530 and the avatar engine 130 can also be operably coupled to each other for purposes described in method 700. The STBs 806 can be operatively coupled to media presentation devices such as a high-definition television (HDTV) 810 which can present avatar images 808 supplied by the avatar engine 130 by way of the STBs. A user 802 of the STB 806 can interact with the avatar image 808 by speech as well as tactile controls using a remote control 804.

The HDTV 812 can also have a common camera sensor 812 for capturing still and/or moving images of the user 802, which an be displayed in part by the HDTV as a picture-in-picture (PIP) image 814. The visual images of the user can be conveyed to the STB 806. Speech can be detected by a microphone of an audio system of the remote control 804 or an audio system of the STB 806. The avatar image 808 can be an animated image, or can have human-like qualities such as the avatar image 809. The STB 806 can transmit to the avatar engine 130 the visual images as well as speech signals of the user 802 for analysis.

The avatar engine 130 can also be communicatively coupled to a mobile phone 805 with a camera 807 that can convey still or moving images of the user 802 to the avatar engine. The mobile phone 805 can have an audio system for receiving responses of the user 802 and for conveying the user's speech to the avatar engine 130. The audio system can also have a loud speaker to convey to the user 802 synthesized speech of the avatar 808 for hands-free operations. To avoid disturbing others, the mobile phone 805 can also incorporate common Bluetooth wireless transceiver technology to communicate with a common Bluetooth headset 811 worn by the user 802. Similarly, the avatar engine 130 can be communicatively coupled to a computer 813 with similar resources as the mobile phone 805.

In another embodiment, the above communication devices (mobile phone 805, STB 806, computer 813) can receive a reproduction in whole or in part of the avatar engine 130 to present the user an interactive avatar with desirable features defined by the user of said recipient communication device. A description of the operations of a service-based interactive avatar or distribution of variant copies of the avatar engine 130 follow below.

With communication system 800 in mind, method 700 can begin with step 702 in which a system offers for sale an avatar engine that can generate a visual representation of an interactive avatar which can engage in a verbal and tactile control communication exchange with its user. The sale can represent a sale of interactive avatar services or a reproduction of an avatar engine in the form of software and other forms of artificial intelligence. The system of step 702 can represent the user's portal 530. Through the portal 530 the service provider of the iMCS 801 can market the sale of an interactive avatar and its corresponding avatar engine. The services or reproductions of the avatar engine can be derived from feature components of the avatar engine 130 shown in FIG. 8, or can be retrieved from a database coupled to the iMCS which the portal can access.

In another embodiment, the system can be represented by a general-purpose interactive avatar generated by the avatar engine 130 of FIG. 8 which proactively markets the sale of an interactive avatar to users of the iMCS 801. The general-purpose interactive avatar can inform users of the iMCS 801 of the availability to purchase services of an interactive avatar or a copy of a corresponding avatar engine that generates the interactive avatar. In this embodiment, the interactive avatar services and/or components of the avatar engine being sold can be derived from the avatar engine 130 of FIG. 8, or can be constructed according to feature components of an avatar engine extracted by the avatar engine 130 from a database operably coupled to the iMCS 801.

A user interested in the purchasing a reproduction or services of an avatar engine can utilize one of the communication devices described earlier (mobile phone 805, STB 806, computer 813, etc.) to request from the system a descriptive list of characteristics of a interactive avatar that may be of interest to the user. In step 704, the system can present the communication device a list of selectable characteristics of a particular interactive avatar. The list presented can include check boxes which the user can select to identify the characteristics of the interactive avatar that are of interest to the user and exclude others by leaving the check boxes unchecked. For instance, suppose that the service provider is selling interactive avatars that can serve as tutors in several subject areas (math, science, SAT or ACT preparation, foreign languages, etc.). Suppose the user selects an interactive avatar to serve as a math tutor. The system can query the user and request a description of the subject of interest by presenting a drop-down menu to identify the grade level, and subject area. The user can for example select $10^{th}$ grade geometry.

The system can also present other characteristics of the interactive avatar that may be qualitative in nature such as for example gender of avatar, race of avatar, color of hair, color of eyes, options for facial and body features, style of clothing, personality (mild-mannered, aggressive, excitable, etc.), voice quality (soft, medium pitch, etc.), age (teenager, young adult, etc.), character disposition (jovial, encouraging), and so forth. It should be evident from these illustrations that the list of selectable characteristics for constructing a desired interactive avatar can be innumerable. It should also be evident that the selectable options can be nested. That is, one selection can invoke another list of selections. For convenience, some of the list of selectable characteristics of the interactive avatar can also have a "select all" option. It should be also noted that in an embodiment where the system is represented by a general-purpose interactive avatar promoting the sale of an avatar, the selection process can be conveyed by the user verbally as well as through keypad or mouse selections.

Once the user has completed the selection process, the system in step 706 can identify the selections made, and can wait for a purchase request initiated by the user. The system can for example present the user a price for purchasing a reproduction and a separate price for services of the interactive avatar according to the selections made. The user can accept the purchase price for either a reproduction or services of the interactive avatar as defined by the user, or change the selections for a more desirable price-feature combination. In step 708 the system can receive a purchase request responsive to the user accepting a sale price (for either a reproduction or services) and the user entering payment information to fulfill the purchase. The purchase request can include credit card acknowledgment information, a PayPal™ acknowledgment, or some other suitable form of payment recognition.

In step 710, the system can construct a model of the avatar engine according to the one or more selections made by the user. The model constructed can represent a partial reproduction of all the possible characteristics available in an avatar engine described by software or other forms of artificial intelligence reflecting the characteristics selected by the user. In step 712, the system can determine from the purchase request whether the request involves a purchase of services generated by the constructed model of the avatar engine in which case the system would proceed to step 714, or a purchase of a copy of the constructed model in which case the system would proceed to step 724.

Assuming services are requested, the system in step 714 can enable the communication device to access the services of the constructed avatar engine. This step can represent establishing a service account for the user of the communication device which can be accessed by the user at his/her leisure. In step 716, the system can stream the interactive avatar to the communication device responsive to the user for example logging into his/her account and requesting the services of the purchased interactive avatar. The communication device can present in step 718 the interactive avatar (on its display) as if the constructed model of the avatar engine were operating in the communication device. The services option can be helpful in situations where the communication device may not have the computing resources to operate the constructed model of the avatar engine.

In situations where the services sold have a usage time limit (such as 60 days), the system can proceed to step 720 and monitor whether the time limit has been triggered. When the time limit expires, the system can terminate in step 722 the interactive avatar services and notify the user by way of the communication device that the duration of the interactive avatar services has been exceeded. The system can provide the user the option to extend the duration of services by invoking another purchase process and thereby delay the termination by resetting a timer operating in the system.

Referring back to step 712, if instead the system detects that the user has purchased a copy of the constructed model of the avatar engine, the system can proceed to step 724 where it transmits to the communication device software in executable machine language or application language (such as a JavaScript) or other forms of artificial intelligence that represents the constructed model of the avatar engine. The communication device can initiate the execution of the constructed model of the avatar engine by way of its computing resources.

In step 726 the system can retrieve a profile of its user which it can supply to the constructed model of the avatar engine to correlate the interactive avatar with the profile of its user. The user's profile can have demographic information of the user (such as age, gender, income, etc.), psychographic information of the user (such as traits, interests, lifestyle, etc.), behavioral modeling information of the user (such as consumption habits, likes and dislikes, etc.) as well as user preferences (such as preferred content sources, list of communication devices of the user, preferences per device, etc.). The profile of the user can be used to further tailor the characteristics of the interactive avatar.

In situations where the constructed model of the avatar engine is supplied with a usage policy, the communication device can proceed to step 728. In this step the communication device can enforce the usage policy as directed by the system. The usage policy can include a temporal usage policy and/or a distribution policy defined by common digital rights management techniques. The temporal usage policy can set a limit of time (such as 1 week) for the constructed model of the avatar engine to operate in the communication device. The distribution policy can restrict distribution of the constructed model of the avatar engine between the communication device and other communication devices. The distribution policy can for example permit the user to move the constructed model of the avatar engine between communication devices of said user, but restrict distribution otherwise.

If a temporal use limit has been triggered, the communication device can proceed to step 732 where it terminates the interactive avatar and discards the constructed model of the avatar engine. Before discarding the avatar engine, however, the communication device can provide the user the option to purchase from the system addition usage time. If such time is purchased, the system can direct the communication device to update the temporal usage policy accordingly. If the communication device detects an attempt by the user to distribute the constructed model of the avatar engine to a device other than what has been allowed by the distribution policy, the communication device can proceed to step 730 where it prevents the distribution and notifies the user of the terms of the policy being enforced.

Upon reviewing the aforementioned embodiments, it would be evident to an artisan with ordinary skill in the art that said embodiments can be modified, reduced, or enhanced without departing from the scope and spirit of the claims described below. Other suitable modifications can be applied to the present disclosure without departing from the scope of the claims below. Accordingly, the reader is directed to the claims section for a fuller understanding of the breadth and scope of the present disclosure.

Figure 9:
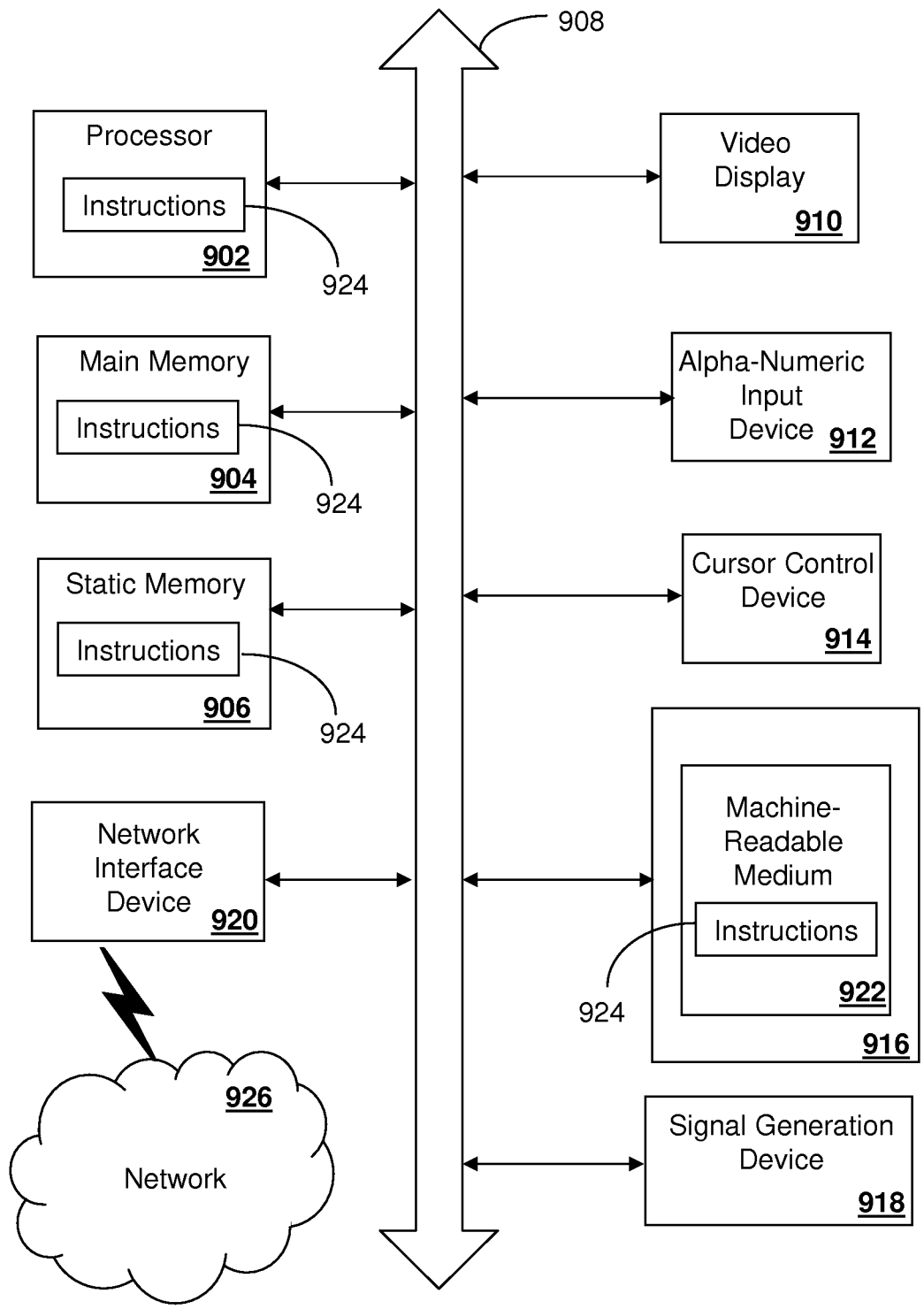
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, wherein responsive to executing the instructions, a processor performs operations comprising:
   receiving from a communication device of a user, a purchase request for avatar software that generates an interactive avatar for engaging in a verbal communication exchange with the user by way of an audio system of the communication device, wherein the purchase request comprises determining a temporal use limit for the interactive avatar, wherein the verbal communication exchange comprises the interactive avatar receiving a verbal input from the user and an analysis of the verbal input by the interactive avatar to generate a response by the interactive avatar, wherein the purchase request is based on a selection of a group of avatar characteristics that are made available to end user devices including the communication device interfacing with an avatar engine, wherein all of the group of avatar characteristics are made available to each of the end user devices for selection;

transmitting to the communication device a usage policy and a copy of the avatar software responsive to the purchase request; and enabling the communication device to access services provided in conjunction with the avatar software via the interactive avatar responsive to the purchase request via the avatar engine.

2. The non-transitory computer-readable storage medium of claim 1, wherein the operations further comprise:

operating as a web portal; and transmitting separate prices for the copy of the avatar software and for the services provided in conjunction with the avatar software.

3. The non-transitory computer-readable storage medium of claim 1, wherein the operations further comprise:

streaming the interactive avatar to the communication device responsive to a request of the communication device to activate the avatar software.

4. The non-transitory computer-readable storage medium of claim 1, wherein the usage policy includes distribution rules enforced by the communication device that limit distribution of the interactive avatar to selected other devices associated with a user of the communication device and prevent distribution of the interactive avatar to second devices that are not associated with the user, and wherein the operations further comprise detecting an attempt to distribute the interactive avatar to one of the second devices, and transmitting a prohibition notification to the communication device responsive to the detecting of the attempt.

5. The non-transitory computer-readable storage medium of claim 4, wherein the usage policy limits an amount of time that the services provided in conjunction with the avatar software via the interactive avatar can be accessed by the communication device according to the temporal limitation, and wherein the interactive avatar is generated based on a user profile associated with the communication device.

6. The non-transitory computer-readable storage medium of claim 1, wherein the operations further comprise:

presenting, to the communication device, the group of avatar characteristics for the interactive avatar;

detecting selections from the group of the avatar characteristics; and constructing a model of the avatar software according to the selections as a constructed model that represents the selections from the group of avatar characteristics, wherein the copy of the avatar software transmitted to the communication device corresponds to the constructed model of the avatar software, and wherein the services made accessible to the communication device are generated based on the model of the avatar software.

7. The non-transitory computer-readable storage medium of claim 1, wherein the operations further comprise generating a response by the interactive avatar to the verbal input based on the analysis.

8. The non-transitory computer-readable storage medium of claim 1, wherein the services utilize one of an Internet Protocol Television communication system, a cable television communication system, a satellite television communication system, an Internet Protocol Multimedia Subsystem communication system, a fixed-line circuit-switched communication system, a cellular communication system or an Internet Service Provider communication system.

* * * * *